Figure 1:
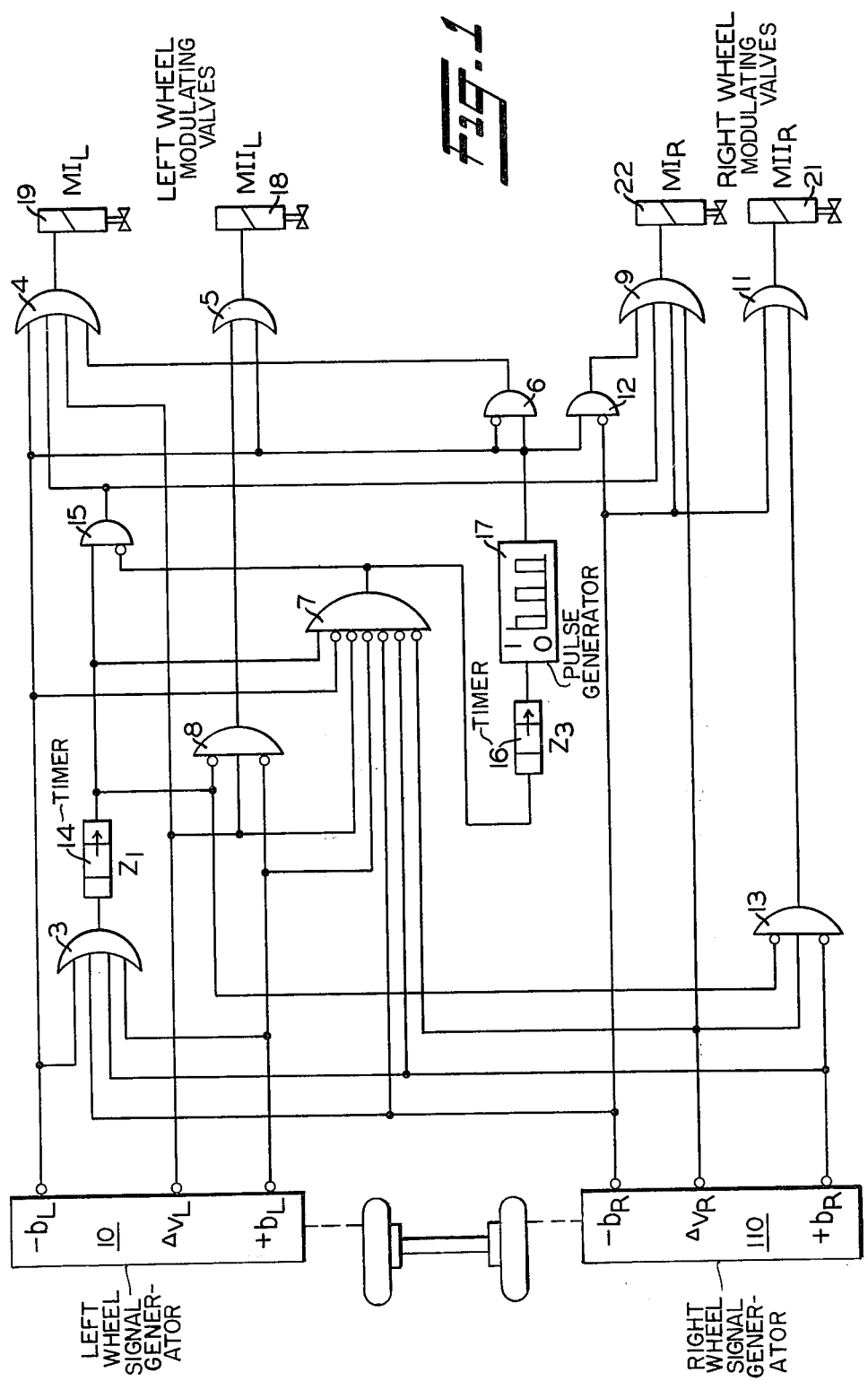

United States Patent [19]
Klatt

[11] 3,926,477
[45] Dec. 16, 1975

[54] ANTI-LOCKING VEHICLE BRAKE SYSTEM FOR INDIVIDUAL WHEEL CONTROL

[75] Inventor: Alfred Klatt, Ronnenberg, Germany

[73] Assignee: WABCO Westinghouse GmbH, Hannover, Germany

[22] Filed: Feb. 7, 1974

[21] Appl. No.: 440,347

[30] Foreign Application Priority Data
Apr. 19, 1973 Germany............................ 2319862

[52] U.S. Cl. ................................ 303/21 P; 303/20
[51] Int. Cl.² ............................................ B60T 8/08
[58] Field of Search............ 188/181 A; 235/150.2; 303/20, 21 AU; 307/10 R; 317/5; 324/162; 340/53, 62, 262

[56] References Cited
UNITED STATES PATENTS

| | | |
|---|---|---|
| 3,637,264 | 1/1972 | Leiber et al. .................... 303/21 BE |
| 3,756,663 | 9/1973 | Fink et al........................ 303/21 BE |
| 3,768,874 | 10/1973 | Riordan .......................... 303/21 BE |
| 3,794,389 | 2/1974 | Davis et al....................... 303/21 P |
| 3,840,278 | 10/1974 | Fleischer et al. ........... 303/21 BE X |

Primary Examiner—Trygve M. Blix
Assistant Examiner—Stephen G. Kunin
Attorney, Agent, or Firm—R. W. McIntire, Jr.

[57] ABSTRACT

An electronic brake control circuit for modulating vehicle brake pressure on an individual wheel basis including apparatus for delaying the reapplication of brake pressure to the faster turning wheel when the slower turning wheel is detected as either skidding during a brake application or as not yet having accelerated to normal rotational speed following correction of a wheel skid, thereby preventing disparities in the different wheel brake pressure from arising sufficient to cause difficulty in maintaining vehicle steering stability.

8 Claims, 2 Drawing Figures

ANTI-LOCKING VEHICLE BRAKE SYSTEM FOR INDIVIDUAL WHEEL CONTROL

BACKGROUND OF THE INVENTION

The present invention is concerned with an anti-skid brake control system in which individual wheel brake control is provided by means of an electronic evaluation circuit whose output influences the respective wheel brake pressure in accordance with input signals supplied by scanning apparatus that continuously monitors the dynamic behavior characteristics of that wheel during a brake application.

Such individual wheel brake control systems, while providing optimum wheel skid control, are known to cause severe steering impairment due to the counter-turning required on the part of the operator to compensate for yawing of the vehicle when different brake forces occur at the opposite wheels of a common axle of the vehicle, particularly an automotive vehicle. These different brake forces may arise as a result of a wheel skid at one wheel requiring a modulation of its braking pressure while the opposite wheel of the same axle is rotating at synchronous speed, i.e., without skidding due, for example, to different road surface conditions to which the different wheels are subject at any given time. Furthermore, unevenly adjusted brakes or brake dimensions reflecting the extreme limits of manufacturing tolerances can result in different wheel brake forces at a given point in time.

Any such variation in the different wheel brake forces of a common axle has an unfavorable effect particularly on vehicles with short wheel bases since the yawing moments produce a dangerous lashing of the vehicle.

SUMMARY OF THE INVENTION

The object of the present invention therefore is to provide an improved anti-skid brake control system for controlling the braking pressure at the individual wheels of a vehicle such that the reapplication of braking pressure following correction of a wheel skid occurs simultaneously at a point in time determined by the slower running wheel.

This is accomplished, according to the present invention, by arranging and interconnecting the evaluation circuit of the individual wheels of a common axle of an automotive vehicle, for example, whereby the brake pressure of a skidding wheel that recovers normal rotation ahead of the other wheel is held constant in the absence of an acceleration signal from the other wheel. This prevents the reapplication of brake pressure at a faster running wheel that has recovered normal speed until the slower running wheel has also accelerated to normal speed. Accordingly, each reapplication cycle of the respective wheels is initiated simultaneously to minimize the brake pressure difference between the wheels during the wheel skid recovery stage of the control cycle.

In addition, the arrangement and interaction of the different wheel evaluation circuits is such that the brake pressure of a non-skidding wheel is held constant, when at the time of a brake application, the other wheel is detected as skidding and its brake pressure released, thereby also minimizing the brake pressure difference during the wheel skid correction stage of the control cycle.

In thus preventing large differences between the respective wheel brake pressures throughout the wheel skid control cycle, better stabilization of vehicle steering is provided with less steering effect.

Figure 2:
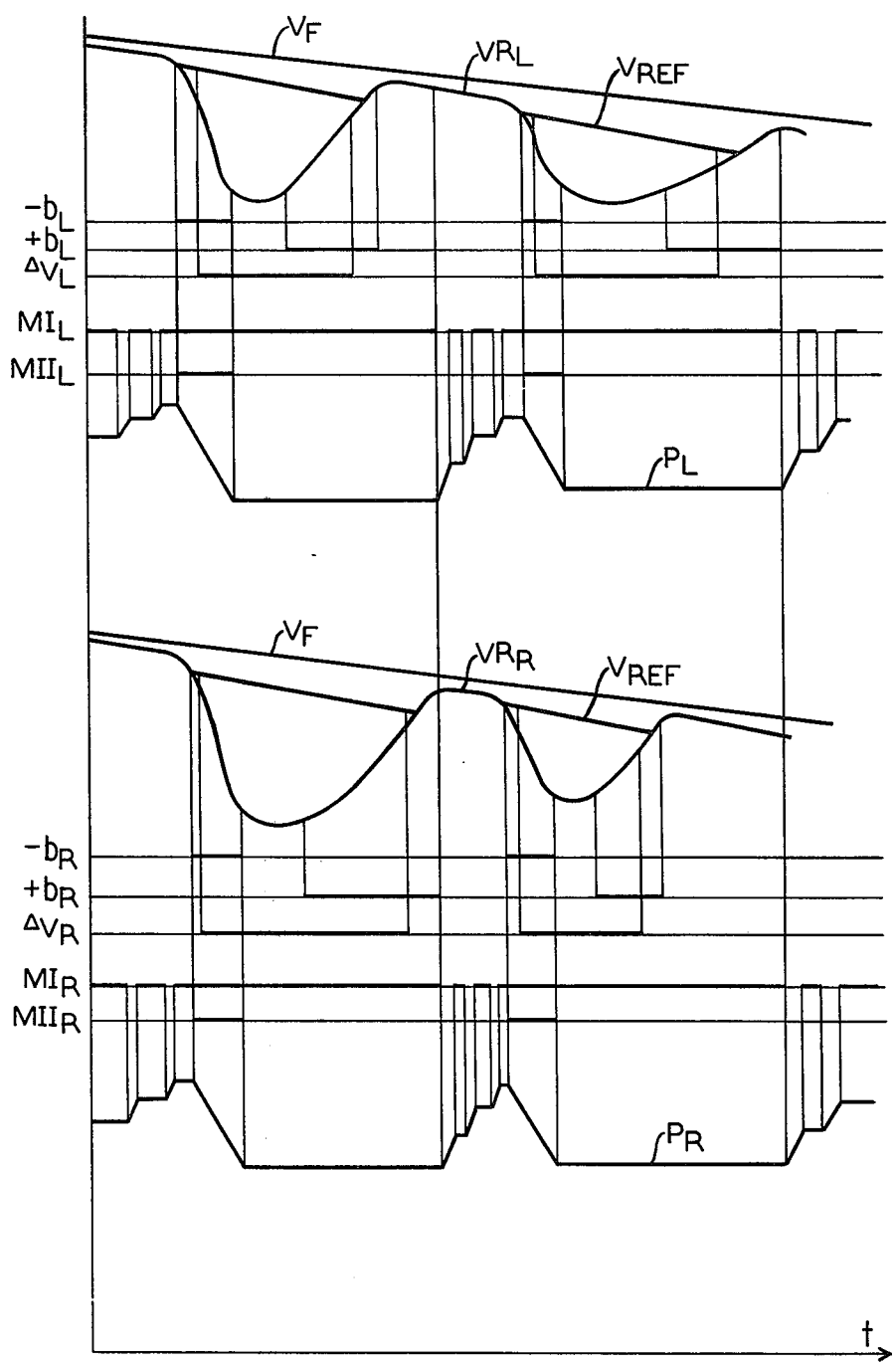

Other objects and advantages of the invention will become apparent from the following more detailed description when taken in accordance with the accompanying drawings in which:

FIG. 1 shows wheel skid control circuitry for the opposing wheels of the same axle of an automotive vehicle and the interconnection of such circuitry in accordance with the present invention; and FIG. 2 shows a graph of the individual wheel brake pressures produced by the control circuitry of FIG. 1 in accordance with wheel behavior signals generated at each wheel.

DESCRIPTION AND OPERATION

Referring to FIG. 1, input signals $-b_L$, $\Delta V_L$ and $+b_L$ are obtained via conventional signal generating means 10 associated with the left wheel of preferably an automotive vehicle, for monitoring the dynamic behavior characteristics of the wheel. Similar signals $-b_R$, $\Delta V_R$ and $+b_R$ are provided by signal generator means 110, which monitors the right wheel of the vehicle, said left and right wheels being carried on a common axle so as to rotate independently of each other. The $-b$ signal for either the left or right wheel is indicative of that wheel decelerating at a rate exceeding a predetermined threshold. The $\Delta V_L$ or $\Delta V_R$ signal for the respective left or right wheel is generated when the wheel velocity $VR_L$ or $VR_R$ becomes a predetermined percentage less than a reference velocity $V_{ref}$ shown associated with the curve appearing in FIG. 2. The $+b$ signal of either the left or right wheel is generated when the wheel velocity reaches a certain acceleration at the time a skidding wheel is regaining synchronous rotation.

The $-b_L$ signal is connected to one input of an OR gate 3, an OR gate 4, an OR gate 5 and to an inverted input of an AND gate 6 and an AND gate 7.

The $\Delta V_L$ is fed directly to another input of OR gate 4 and to the input of an AND gate 8, as well as to an inverted input of AND gate 7.

The $+b_L$ signal is connected directly to another input of OR gate 3, as well as to another inverted input of AND gates 7 and 8.

The $-b_R$ signal is connected directly to one input of an OR gate 9, an OR gate 11 and the OR gate 3, as well as to a negated input of an AND gate 12 and AND gate 7.

The $\Delta V_R$ signal is connected directly to another input of OR gate 9 and an input of an AND gate 13, as well as to another negated input of AND gate 7.

The $+b_R$ signal is connected directly to another input of OR gate 3 and to another negated input of AND gates 7 and 13.

The output of OR gate 3 is connected to a release lag timing circuit 14, whose output signal is maintained for a predetermined duration $Z_1$ after the output of OR gate 3 disappears. The output of timing circuit 14 is connected to an input of AND gate 7 and an AND gate 15, as well as to another negated input of AND gates 8 and 13.

The output of AND gate 7 is connected to the negated input of AND gate 15 and also to another release lag timing circuit 16, whose output is in turn connected to the input of a conventional pulse generator device 17. The output pulses of pulse generator 17 are connected to an input of AND gates 6 and 12.

The output of AND gate 8 is connected to an input of OR gate 5, whose output controls energization of a solenoid 18 of an electro-pneumatic release modulating valve $MII_L$ located in the delivery line leading to the left wheel brake cylinder device, not shown. In the enerized state of solenoid 18, modulating valve $MII_L$ is actuated to its open position in which brake cylinder pressure is exhausted and in the deenergized state, is actuated to its closed position in which the exhaust of brake pressure is cut off.

The output of OR gate 15 is connected to an input of each OR gate 4 and 9. The output of AND gate 6 is also connected to an input of OR gate 4, whose output controls energization of a solenoid 19 of an electro-pneumatic modulating valve $MI_L$ located in the delivery line of the left wheel brake cylinder device ahead of modulating valve $MII_L$. In the energized state, solenoid 19 causes actuation of modulating valve $MI_L$ to its closed position in which the delivery of brake cylinder pressure is interrupted and when deenergized actuates valve $MI_L$ to its open position to provide for the supply of delivery pressure to the brake cylinder.

The output of AND gate 13 is connected to an input of OR gate 11, whose output controls energized of solenoid 21 of a modulating valve $MII_R$. Release of brake pressure at the right wheel brake cylinder device, not shown, is controlled by modulating valve $MII_R$, which is similar to modulating valve $MII_L$ of the left wheel.

The output of AND gate 12 is connected to an inlet of OR gate 9, whose output controls energization of solenoid 22 of a modulating valve $MI_R$ that is similar to modulating valve $MI_L$ and provides for control of delivery pressure to the right wheel brake cylinder device.

From the above, it will be apparent that OR gate 3, timer 14 and AND gate 15, as well as OR gate 7, timer 16 and pulse generator 17 are common to the respective left and right wheel evaluation circuits described, while gates 4, 5, 6 and 8, and modulating valves $MI_L$ and $MII_L$ are associated with the left wheel evaluation circuits, just as gates 9, 11, 12 and 13, and modulating valves $MI_R$ and $MII_R$ are associted with the right wheel evaluation circuits.

Operation of the invention in accordance with the evaluation circuitry above described can be more easily understood by reference to FIG. 2, which shows the left and right wheel brake pressure curves and the critical wheel behavior signals generated at different points in time, by means of which signals the different wheel evaluation circuits effect variation of the respective wheel braking pressures.

If it is assumed at the time of a brake application that the deceleration of both the left and right wheels becomes excessive, the predetermined deceleration threshold is overcome and both the $-b_L$ and $-b_R$ signals will appear. The $-b_L$ signal energizes solenoid 19 of modulating valve $MI_L$ via OR gate 4 and accordingly interrupts further supply of delivery pressure $P_L$ to the left wheel brake cylinder device. At the same time, the $-b_L$ signal acts via OR gate 5 to energize solenoid 18 of valve $MII_L$ to exhaust the left wheel brake pressure. Concurrently, the $-b_R$ signal acts via OR gates 9 and 11 to energize solenoids 22 and 21 of the respective modulating valves $MI_R$ and $MII_R$ associated with the right wheel brake cylinder device. Accordingly, each wheel is individually controlled via their respective wheel evaluation circuits, which respond to the $-b_L$ and $-b_R$ signals to effect a reduction of brake pressure until the wheel deceleration falls below the deceleration threshold.

At this point the $-b_L$ and $-b_R$ signals disappear. However, prior to this, the decreased wheel velocity $VR_L$ and $VR_R$ decreases to a predetermined percentage of $V_{ref}$ to accordingly generate signals $\Delta V_L$ and $\Delta V_R$, which signals remain in effect until the wheel velocity is restored to within a predetermined percentage of the reference velocity $V_{ref}$. Accordingly, signals $\Delta V_L$ and $\Delta V_R$ acting through OR gates 4 and 9 maintain the respective valves $MI_L$ and $MI_R$ in their closed position while loss of signals $-b_L$ and $-b_R$ allows the respective valves $MII_L$ and $MII_R$ to return to their normally closed position to terminate further exhaust of brake pressure $P_L$ and $P_R$. Thus, brake pressure at both the left and right wheels is held constant, during which holding phase of the control cycle, the wheels are capable of accelerating until synchronous wheel rotation is recovered.

The $+b_L$ and $+b_R$ signals are generated during this acceleration period concurrent with the $\Delta V_L$ $\Delta V_R$ signals and act via OR gate 3, timer circuit 14 and AND gate 15 to maintain solenoid valves 19 and 22 energized following disappearance of the $\Delta V_L$ and $\Delta V_R$ signals at the time wheel velocity increases above the predetermined percentage of the reference velocity $V_{ref}$. Modulator valves $MI_L$ and $MI_R$ thus continue to maintain brake pressure $P_L$ and $P_R$ constant in this holding phase.

Now let it be assumed that the left wheel is running on a road surface having a higher coefficient of friction than the road surface on which the right wheel is running so that the left wheel actually accelerates toward synchronous rotation ahead of the right wheel. This results in the left wheel acceleration signal $+b_L$ vanishing prior to the right wheel acceleration signal $+b_R$. In the prior art arrangements, this would immediately initiate a reapplication of braking pressure $P_L$ via modulating valve $MI_L$ of the left wheel, which would accordingly restore increased braking on the left wheel while the right wheel braking remained constant until it also accelerated to a predetermined velocity.

In order to prevent this ensuing braking difference between the respective wheels and the consequent yawing effect upon the vehicle, with attendant steering difficulty, the present invention delays the reapplication of brake pressure to either wheel until each wheel has reached a velocity sufficient to cause both the $\Delta V_L$ and $\Delta V_R$ signals to vanish. This is represented in the first control cycle of FIG. 2 in which the left wheel brake pressure $P_L$ remains constant, even after the wheel velocity signal $\Delta V_L$ has disappeared. The $+b_R$ signal, which is noted in FIG. 2 as persisting for a period of time following disappearance of the counterpart $+b_L$ signal, acts through OR gate 3, timer circuit 14 and AND gate 15 to maintain both solenoid valves 19 and 22 energized via OR gates 4 and 9 respectively, it being understood that AND gate 15 is maintained in its "enabled" condition by the output of OR gate 7 until all of the wheel behavior signals assume a logical 0 state. Accordingly, modulating valves $MI_L$ and $MI_R$ are thus actuated to cut off the supply of delivery pressure to the respective wheel brake cylinders so as to maintain a constant level of brake pressure and accordingly minimize any difference between the wheel brake pressure that tends to accumulate throughout the several control cycles registered during a brake application.

When the right wheel velocity finally increases sufficiently that the velocity signal $\Delta V_R$ vanishes, all the wheel behavior signals at the inverted inputs of OR gate 7 become a logical 1. Due to the time delay $Z_1$ imposed by timing circuit 14, the remaining input of OR gate 7 is also a logical 1, thereby presenting a logical 1 output to the inverted input of AND gate 15 and to the input of timer circuit 16. AND gate 15 is accordingly disabled and thus removes the only signal still remaining at OR gates 4 and 9, which accordingly deenergizes solenoid valves 19 and 22, in turn allowing modulator valves $MI_L$ and $MI_R$ to return to their normal position in which delivery pressure is restored to the respective wheel brake cylinders. This results in a concurrent reapplication of brake pressure $P_L$ and $P_R$ to the respective wheels at a point in time determined by the ability of the slower running wheel to regain normal wheel rotation.

With the timer circuit 16 concurrently operating, pulse generator device 17 now supplies an intermittent output signal to AND gates 6 and 9, which in the absence of the respective deceleration signal $-b_L$ and $-b_R$ at their inverted input, act via OR gates 4 and 9 to periodically energize solenoid valves 19 and 22 to provide a stepped reapplication of the braking pressure. This results in a controlled reapplication of brake pressure $P_L$ and $P_R$ via modulating valves $MI_L$ and $MI_R$ to prevent the increased braking from being so rapid as to provoke excessive control cycles.

If it is now assumed that the right wheel rather than the left wheel is running on a road surface having the higher coefficient of friction, so as to resume normal rotation prior to the left wheel following loss of adhesion, as indicated during the second control cycle shown in FIG. 2, reapplication of the right wheel brake pressure $P_R$ is delayed following loss of the acceleration signal $\Delta b_R$ until the left wheel acceleration signal $\Delta b_L$ also disappears. When this occurs, the reapplication of both the left and right wheel brake pressure $P_L$ and $P_R$ is initiated simultaneously in a manner similar to that previously explained with reference to the first control cycle in the graph of FIG. 2. It is apparent therefore that irrespective of the different coefficients of friction of the road surface on which the respective left and right wheels may be running and thus accelerating at different rates following a controlled reduction of brake pressure, restoration of braking is initiated simultaneously at each wheel at a point in time determined by the slower accelerating wheel.

It is to be further noted that the arrangement and interconnection of the evaluation circuitry according to the invention also provides that the wheel that first loses adhesion, due to a lower coefficient of friction of the road surface on which it is running, influences the other wheel evaluation circuit such as to interrupt further buildup of brake pressure to the other wheel during the period the first mentioned wheel brake pressure is being released. Again, the purpose of this is to prevent large differences from arising between the respective wheel brake pressures. For example, if a deceleration signal $-b_L$ arises at the left wheel during a brake application indicating a loss of adhesion between that wheel and the road, while concurrently the right wheel maintains normal rotation, both OR gates 4 and 9 receive an input signal via OR gate 3, timer circuit 14 and AND gate 15. Solenoid valves 19 and 22 are thus energized to cause modulator valves $MI_L$ and $MI_R$ to each interrupt delivery of brake pressure to the respective left and right wheel brake cylinders, while concurrently solenoid 18 of valve $MII_L$ is energized via OR gate 5 to effect a release of the left wheel brake pressure. Thus, the right wheel brake pressure is held constant while the left wheel brake pressure is reduced to thereby avoid excessive differences between the respective wheel brake pressures at this time, as well as during the period when subsequent reapplication of brake pressure is indicated, as herebefore explained.

Having now described the invention, what I claim as new and desire to secure by Letters Patent is:

1. A fluid pressure actuated anti-skid brake control system for a vehicle having a pair of brake equipped wheels that are independently rotatable on a common axle of the vehicle, said system comprising:
   a. signal generator means for providing a plurality of wheel behavior signals according to the dynamic conditions of each respective wheel of said axle;
   b. valve means at each wheel for modulating the brake pressure thereat; and
   c. evaluation circuit means subject to said wheel behavior signals of the respective wheels for controlling said valve means, said evaluation circuit means being arranged so that when one of said wheel behavior signals of either one of said wheels is shifted in time relative to the corresponding one of said wheel behavior signals of the other of said wheels, the brake pressure of the faster rotating wheel is influenced, by said at least one of said wheel behavior signals of the slower rotating wheel, in such sense as to be held constant.

2. The system as recited in claim 1, further characterized in that said at least one of said wheel behavior signals is a deceleration signal generated when the rate of deceleration of said slower running wheel exceeds a predetermined threshold.

3. The system as recited in claim 2, further characterized in that said valve means of said slower running wheel effects a reduction of brake pressure therefrom in response to said deceleration signal.

4. The system as recited in claim 1, further characterized in that said at least one of said wheel behavior signals is an acceleration signal generated when the rate of acceleration of said slower running wheel exceeds a predetermined threshold.

5. The system as recited in claim 4, further characterized in that the brake pressure of each of said wheels is reapplied simultaneously upon disappearance of said acceleration signal from said slower running wheel.

6. The system as recited in claim 1, wherein:
   a. said valve means comprises:
      i. supply valve means for interrupting the supply of fluid brake pressure when actuated from a normal position in which said supply of brake pressure is provided; and
      ii. release valve means for exhausting fluid brake pressure when actuated from a normal position in which the exhaust of brake pressure is interrupted;
   b. said wheel behavior signals including a deceleration signal generated when a respective one of said wheels exceeds a predetermined deceleration threshold and an acceleration signal when a respective one of said wheels exceeds a predetermined acceleration threshold, and
   c. said evaluation circuit means includes means subject to said deceleration and acceleration signals from each of said wheels in response to any one of which is provided a first output signal for actuating said supply valve means of each of said wheels, said exhaust valve means of each respective wheel being actuated in response to said deceleration signal thereof.

7. The system as recited in claim 6, wherein said evaluation circuit means further comprises:
 a. pulse generator means that produces a second output signal in parallel with said first output signal for periodically effecting actuation of said supply valve means of each of said wheels; and
 b. disabling means subject to said wheel behavior signals of each of said wheels for interrupting said first output signal only in the absence of each of said wheel behavior signals.

8. The system as recited in claim 7, further characterized in that said disabling means effects interruption of said first output signal and simultaneously initiates operation of said pulse generator means.

* * * * *